May 16, 1961 J. B. ROCHE ET AL 2,984,173
EXTRUSION DIE FOR BRIQUETTING MACHINE
Filed May 15, 1958 2 Sheets-Sheet 1
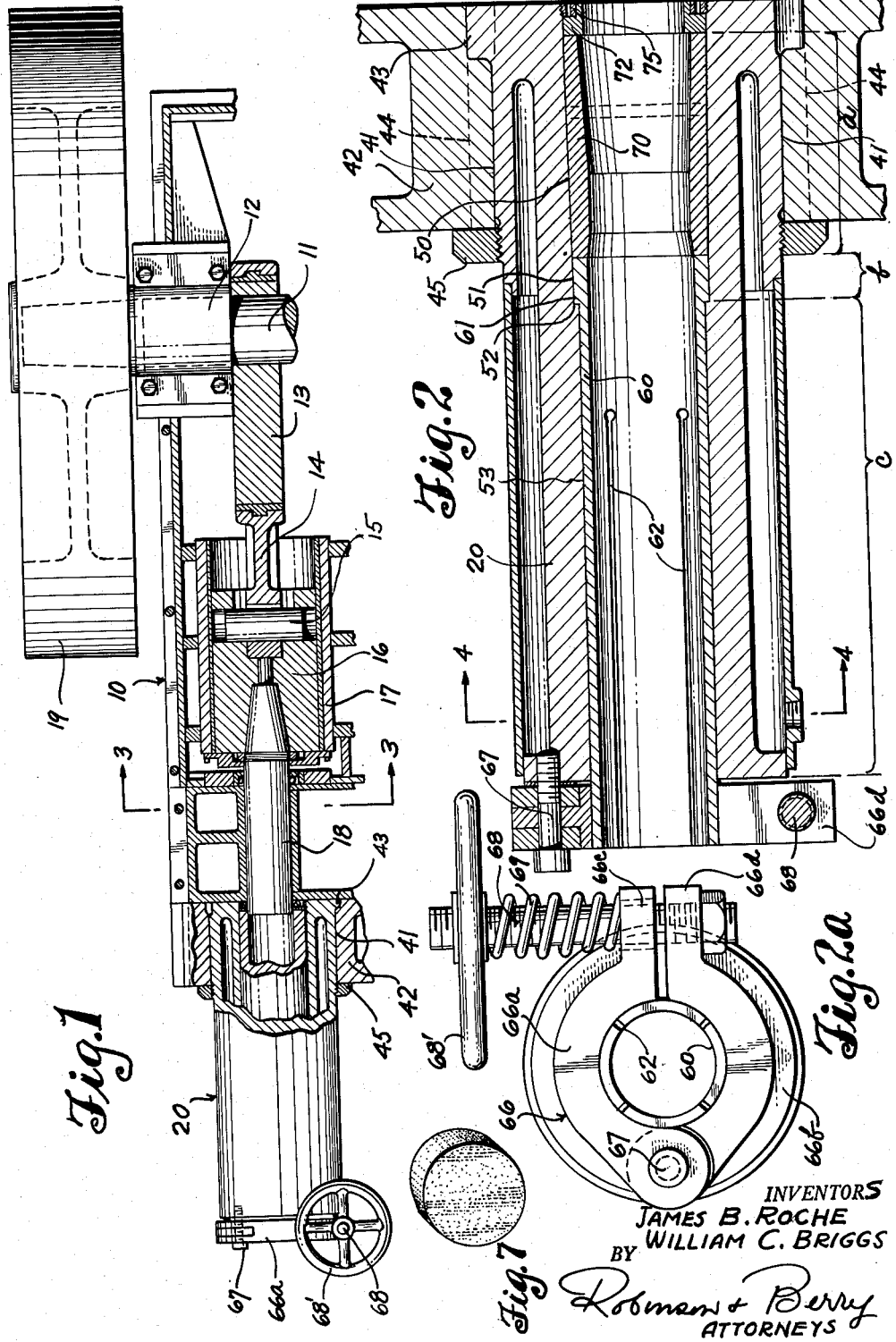
INVENTORS
JAMES B. ROCHE
WILLIAM C. BRIGGS
BY
Robinson & Berry
ATTORNEYS May 16, 1961  J. B. ROCHE ET AL  2,984,173
EXTRUSION DIE FOR BRIQUETTING MACHINE
Filed May 15, 1958  2 Sheets-Sheet 2
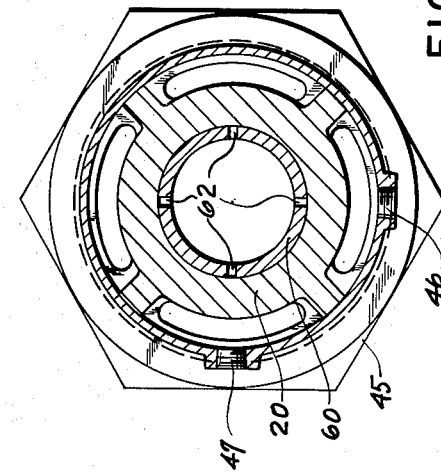
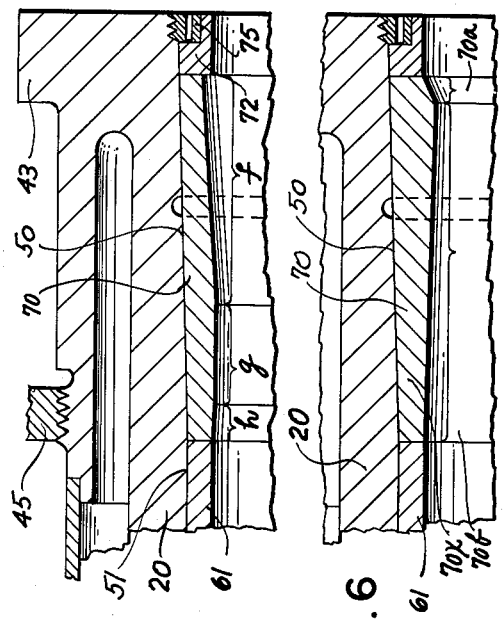
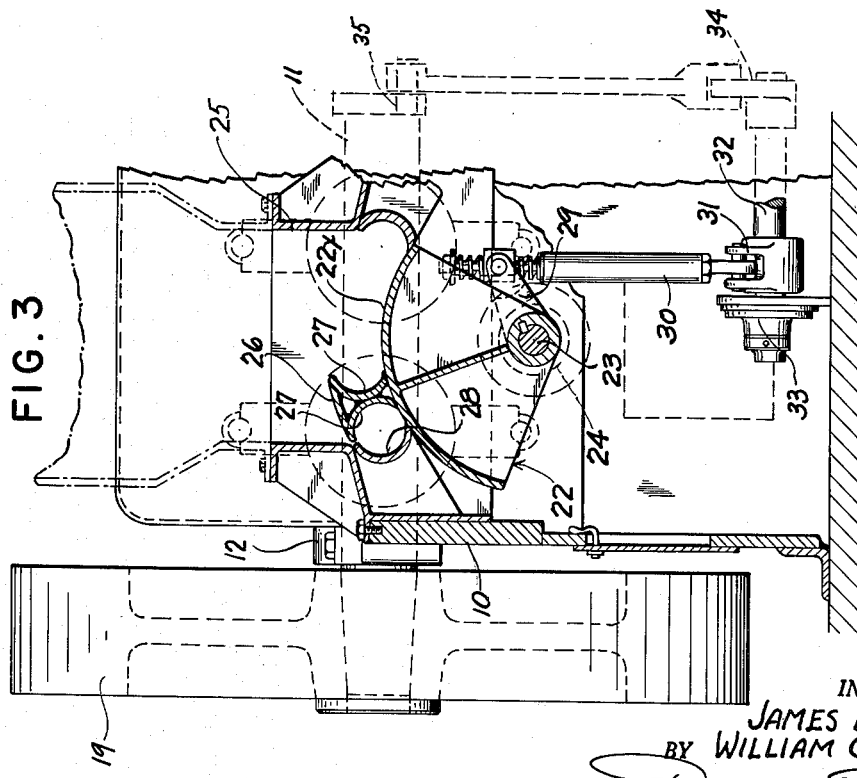
INVENTOR.
JAMES B. ROCHE
BY WILLIAM C. BRIGGS
Robinson + Berry
ATTORNEYS

United States Patent Office 2,984,173
Patented May 16, 1961

2,984,173

EXTRUSION DIE FOR BRIQUETTING MACHINE

James B. Roche, Lake Stevens, and William C. Briggs, Everett, Wash., assignors to Sumner Iron Works, Inc., Everett, Wash.

Filed May 15, 1958, Ser. No. 735,426

2 Claims. (Cl. 100—93)

This invention relates to improvements in machines which are generally designated as "briquetting machines." More particularly, it has reference to the provision of an improved form of extrusion die for use with machines as presently being employed for the making of briquettes, pellets or wafers from prepared forage crop materials such as alfalfa, clover, hay, straw, sugar beet tops, beet pulp and the like for the feeding of cattle and other forage consuming ruminant animals.

One of the principal objects of the present invention is to provide an improved form of extrusion die for use in conjunction with a reciprocating ram, or other form of powered compacting means, wherein a prepared forage material such as, for example, alfalfa or hay, that has been chopped or otherwise reduced to short pieces, may be formed into wafers or pellets of sufficient compactness to insure them against disintegration while being handled, shipped or stored, yet are not of such density or compactness as to be impractical for consumption by the animals for which they are intended.

It is also an object of this invention to provide an extrtusion die through which charges of selected forage materials or mixtures of forage materials, grasses, etc., may be successively advanced by a reciprocating ram for their formation into wafers and with which die a means is associated whereby more or less resistance to the advancement of material through the die head may be produced as a means for goverening the final compactness of the formed wafers or pellets.

It is also an object of the present invention to provide the present extrusion die with a housing formed with a passage from end to end that mounts the pressure head or die within the receiving end thereof and which passage, beyond said die, is lined with an after cylinder or sleeve of substantial length that is exteriorly tapered and is longitudinally split along its discharge end portion, and about which tapered end portion a longitudinally split collar or constricting sleeve is fitted for diametrical adjustment by a clamping mechanism thus to cause the discharge end of the after cylinder to be constricted to more or less extent for the purpose of regulating the resistance to advancement of the compressed material from the die and through the after cylinder.

Yet another object of the invention is to provide an extrusion die of the above character into which charges of the material to be briquetted are advanced by the ram through a ring of fixed diameter and received within the continuing and coaxial passage of the pressure head die; the die passage being tapered toward its discharge end and merging into a bore of uniform diameter, lesser than that of the ring and terminating in a slight flare that opens coaxially into the receiving end of the previously mentioned after cylinder or split end sleeve. Thus, the entering charges of forage material, upon being forced through the tapered portion of the die passage are caused to be reduced diametrically while also being compressed endwise and then, upon being advanced from the die into the after cylinder or split sleeve, will be permitted a slight amount of diametrical expansion but will still have a certain amount of looseness in the after cylinder that permits their final compactness to be regulated to the greater extent by the diametric adjustment of the constricting collar applied about the split end of the after cylinder.

Further objects and advantages of the invention are to be found in the provision of a water cooled die housing; in the details of construction and relationship of the various parts constituting or defining the extrusion passage through the die housing; in the features of the constricting clamp and collar applied about the discharge end of the after cylinder and in the combination of the die with a reciprocally operating ram whereby pre-pressed charges of the selected forage material are advanced successively through the die to form the present wafers.

It is also a principal object of the present invention to provide a novel method of manufacturing wafers of the kind disclosed that is economical, practical and capable of being carried out at high rate.

In accomplishing the above mentioned and other objects of the invention, we have provided the improved details of construction, the preferred forms of which are illustrated in the accompanying drawings, wherein:

Fig. 1 is a plan view of one unit of a briquetting machine in which an extrusion die embodied by the present invention is employed; some parts of the machine being shown in section for better understanding of their construction.

Fig. 2 is an enlarged, vertical section of the extrusion die, taken along its axial line.

Fig. 2a is an end view of the extrusion die.

Fig. 3 is a transverse, vertical section of the machine taken on line 3—3 in Fig. 1.

Fig. 4 is a cross-section of the die as seen on line 4—4 in Fig. 2.

Fig. 5 is a fragmental sectional detail of the die head.

Fig. 6 is a fragmental sectional detail of a die head for use for the making of briquettes from sugar beet pulp.

Fig. 7 is a perspective view of one of the formed wafers or briquettes.

In the following description the term "wafers" will be used to designate the product that is formed by the compacting of the individual charges of material in the die; this applies to what may heretofore have been referred to as briquettes, pellets or wafers. Also, the term "hay" will be used to designate the material being briquetted whether it be alfalfa, clover, straw, dried beet tops or other forage materials suitable for the formation of wafers in the present die.

Referring more in detail to the drawings:

In Fig. 1, we have shown in plan view, a form of briquetting machine in which the extrusion die of the present invention is employed. Briefly described the machine here shown comprises a suitable frame structure 10 in which a horizontal and transversely directed crank shaft 11 is rotatably supported in a bearing 12. Fixed on the crank shaft is an eccentric 13 about which one end of a connecting rod 14 is rotatably mounted; the other end of the connecting rod being pivotally fixed by a pin 15, to a piston 16 which is reciprocally contained in a cylindrical guide bearing 17 that is rigidly mounted in the frame structure 10. Fixed in the forward end portion of the piston, coaxially thereof and extending forwardly therefrom, is a cylindrical ram 18.

The crank shaft 11 is equipped at one end with a belt wheel 19 by which it may be rotatably driven. When the shaft is thus driven, it reciprocally actuates the ram 18, and the reciprocating ram coacts with means whereby charges of selected forage material are pre-pressed, to successively advance the pre-pressed charges into and through the present extrusion die. The present extrusion die comprises a cylindrical housing or holder that is designated in its entirety in Fig. 1 by reference numeral 20 and it is further shown in Fig. 1 that the housing 20 is fixedly mounted in the frame structure 10 in coaxial alignment with the ram 18.

The present machine also includes, in combination with the reciprocating ram and extrusion die, a material pre-pressing means which is described and claimed in a co-pending application filed under Serial No. 733,208, on May 5, 1958. This pre-pressing means is best shown in Fig. 3 wherein 22 designates an arcuate sweep that is fixed to and is supported for oscillation by a shaft 23; this shaft being supported horizontally and for oscillation in suitable bearings such as indicated at 24, which are fixed in the frame structure 10 of the machine. Shaft 23 is parallel with the axial line of travel of the ram 18, and the sweep has a cylindrically curved top wall 22x, curved about the axial line or shaft 23. This wall 22x forms the bottom of the material feed hopper shown in Fig. 3 and designated by reference numeral 25.

Mounted on the curved top wall of the sweep, midway of its opposite side edges, is a cross-head 26 that is formed with semi-cylindrically cupped opposite side surfaces 27, one of which is adapted to coact for the pre-pressing of the material with a similarly cupped but oppositely related plate 28 that is fixed at the lower end and at one side of the hopper, and toward and from which cross head 26 moves as the sweep oscillates.

The means for oscillating the sweep is as shown in Fig. 3. Briefly described it comprises a short rocker arm 29 that extends radially from shaft 23 and which is pivotally connected to the upper end of a link 30 which, at its lower end is connected to a rocker arm 31 fixed on a rock shaft 32 mounted in a bearing 33. At its end, shaft 32 is equipped, with a rocker arm 34 which connects to an eccentric 35 on the end of crank shaft 11. The arrangement and operation of the above mentioned parts is such that when the head 26 swings away from the plate 28, prepared forage material moves downwardly within the hopper 25 to fill the space between them. Then when the sweep moves the head back toward plate 28, this material is pre-pressed between them into a wafer forming charge of cylindrical form. As this pre-pressed charge is being thus formed, and held between the semi-cylindrically cupped parts 27—28, the ram 18 comes forwardly and pushes it endwise into the receiving end of the die housing 20 and into the forming die as fixed therein. With the successive formation and advancement of the pre-pressed charges into the die, the wafers are formed therefrom, and are progressively advanced through this die passage.

The die housing, the forming die and after cylinder are constructed and assembled as follows, reference being directed particularly to Figs. 2, 4 and 5: the die housing, designated in its entirety by reference numeral 20, is substantially of cylindrical form and is fixed at its material receiving end in a bore 41 formed through a transversally directed member 42 of the frame structure 10. At its inner end the housing is equipped at regular intervals circumferentially thereof with anchoring lugs 43 that are adapted to be passed through slots 44 formed in the walls of the bore 41 and then, by slight rotative adjustment of the housing, to be locked in the bore. A nut 45 is then applied about the housing and threaded onto the mounting end portion thereof and tightened against the frame member 42 as observed in Fig. 2, to coact with the lugs 43 to rigidly fix the die housing in axial alignment with the ram. The housing 20 is water jacketed and the jacket is equipped with water intake and outflow passages, as shown at 46 and 47 in Fig. 4, to permit the circulation of a coolant about the die passage. The housing 20 is shown in Fig. 2 to be formed from end to end with a continuous, cylindrical passage in which the pressure head, or what herein has been designated as the head die, and the after cylinder, or split sleeve, are contained.

At its material receiving end, the die housing 20 is formed with a slightly tapered bore 50 which terminates in a short bore 51 of uniform diameter leading to an annular shoulder 52 that faces toward the entrance end of the die. From this shoulder a uniform bore 53 extends to the discharge end of the housing. The extent of these various bores 50, 51 and 53 are indicated respectively, by the span of the brackets a, b, and c applied to Fig. 2 of the drawing immediately below the view.

Fitted within the bores 51 and 53 is the after cylinder 60, or what will hereinafter be designated as the "split sleeve." This is formed at its receiving end with an encircling hub or shoulder 61 that fits within the bore 51 and seats firmly against the annular shoulder 52. From this hub the sleeve extends to and slightly beyond the discharge end of the housing as shown in Fig. 2. It is formed, from its discharge end for a distance which is approximately two-thirds of its length, at 90 degree intervals, with continuous slits 62 as shown in Figs. 2 and 4 which permit the discharge end portion of the sleeve to be constricted to limited extent.

Fitted about that outer end potion of sleeve 60 that is extended from the housing 20 is a constricting clamp 66. A sleeve constricting force effected by this clamp results in compressing the split or separated end portions of the sleeve 60 together thus to decrease the diameter of the sleeve passage accordingly. With the release of the clamping face the sleeve is permitted to expand accordingly.

The clamp 66, as applied about the extended end of the sleeve 60 comprises upper and lower semi-circular member 66a and 66b. These are fitted to the top and lower sides of the sleeve. They are hingedly joined at the side of the sleeve by a hinge pin 67 that is threaded into the end of housing 20 as shown in Fig. 2. The opposite end portions of these clamping members terminated in spaced lugs 66c and 66d. A bolt 68 is passed vertically and with clearance through a hole in the lug 66c, and has a fixed connection with the lug 66d. Threaded onto the upper end of the bolt is a wheel 68' and disposed between the hub of this wheel and the lug 66c, under compression, is a heavy coiled spring 69. By adjustment of the wheel inwardly or outwardly along the bolt, the sleeve constricting force may be increased or decreased accordingly, thus to contract, to more or less extent, the discharge end of sleeve 60.

Referring now to the extrusion die proper, particularly as shown in Fig. 5: Fitted in the tapered end bore 50 that leads into the receiving end of the die housing, is the head die 70. At its inner end, this engages firmly against the end of the hub 61 of sleeve 60 and it is held seated by a ring 72 that is fitted in the larger end of the bore against the end surfaces of the die. Ring 72, in turn, is secured by a ring nut 75 that is threaded into the bore against a shoulder of the ring. The ring 72 provides an entrance passage, corresponding in diameter to that of the pre-pressed charges of material, that opens into the die passage through which the pre-pressed charges of material are advanced directly from the pre-pressing means by the reciprocating ram 18.

The die head 70 is formed with an inwardly tapered bore that extends a distance defined by bracket f in Fig. 5. This bore is just slightly greater in diameter at its receiving end than the inside diameter of the passage through the ring 72 and it tapers to a uniform bore defined by bracket g in Fig. 5, having a diameter that is slightly lesser than that of the inside diameter of the ring and then flares through the length of bracket h to a greater diameter equaling that of the inside diameter of the sleeve 60 at its receiving end.

With the die head 70, sleeve 60 and ring 72 so formed and assembled in the die housing 20, as shown in Fig. 2, it will be understood that the charges of hay, which are pre-pressed to the diameter of the cylindrical opening through ring 72, when pushed forward into housing 20 by the ram 18 will enter the die head 70 through ring 72 and by reason of the taper of the die passage, will be compressed diametrically as well as endwise. As each compressed charge, as reduced in diameter and length in the die head 70, moves therefrom into sleeve 60 it will receive practically no resistance to its advancement by reason of the enclosing cylindrical wall of the sleeve. Whatever additional resistance that is desired may then be effected by constricting the discharge end portion of sleeve 60 through the proper adjustment of the clamp 66. The compactness of the wafer can thus be regulated or established to a fine degree by means of the clamp.

It will be understood that constricting the discharge end of the passage through the sleeve 60 by means of the clamp will cause resistance to advancement of the wafers in the cylinder, and the greater the resistance, the harder or more compact they will be.

In Fig. 6 we have illustrated a die that is especially designed for the making of briquettes or wafers from material such as sugar beet pulp, or other material of similar character. This die, designated by reference numeral 70x has a sharply tapered entrance passage 70a leading into a long and gradually increasing passage 70b. The passage 70a, at its receiving end is equal in diameter to the inside of ring 72, and the passage 70b is equal in diameter at its discharge end to the inside diameter of the after cylinder 60.

What we claim as new is:

1. An extrusion die of the character described comprising a die housing that is jacketed for water cooling, and is formed with a tubular passage leading therethrough, an extrusion die head fitted and secured in said tubular passage at the receiving end of the housing, a sleeve fitted in the tubular passage and extending from the discharge end of the die head to beyond the discharge end of the housing, said sleeve being longitudinally split at intervals thereabout from its discharge end forwardly for the greater part of its length, and an adjustable clamp applied about the extended end portion of said sleeve, said tubular passage of the die housing being tapered at its receiving end and formed near the inner end of said tapered portion with an encircling shoulder that faces toward the receiving end of the housing, said sleeve being formed about its receiving end with a hub that is seated against said shoulder, and said die head being exteriorly tapered to fit the taper of the receiving end portion of the housing and adapted to engage at its inner end against the hub of said sleeve.

2. The extrusion die recited in claim 1 wherein a ring is fitted in the receiving end of the housing passage and is seated against the receiving end of said die head and a ring nut is threaded into the housing passage against said ring to secure the die head against the sleeve and the sleeve hub against said shoulder.

References Cited in the file of this patent

UNITED STATES PATENTS

| | | |
|---|---|---|
| 657,607 | Luzzatto | Sept. 11, 1900 |
| 729,149 | Fenn | May 26, 1903 |
| 1,163,448 | Penkala | Dec. 7, 1915 |
| 1,577,015 | Glaze | Mar. 16, 1926 |
| 1,706,801 | Merrill | Mar. 26, 1939 |
| 2,205,865 | Schwarzkoph | June 25, 1940 |
| 2,443,586 | Stuart | June 15, 1948 |
| 2,783,771 | Thomas | Mar. 5, 1957 |
| 2,810,181 | Ruckstuhl | Oct. 22, 1957 |
| 2,833,633 | Hecht | May 6, 1958 |

FOREIGN PATENTS

| | | |
|---|---|---|
| 48,725 | Denmark | May 7, 1934 |
| 250,465 | Switzerland | June 1, 1948 |
| 426,428 | Italy | Oct. 24, 1947 |
| 534,774 | Canada | Dec. 25, 1956 |